(12) United States Patent
Kisch et al.

(10) Patent No.: US 8,012,291 B2
(45) Date of Patent: Sep. 6, 2011

(54) BACKING FILM REMOVAL SYSTEM AND METHOD FOR FIBER PLACEMENT MACHINE

(75) Inventors: Robert A. Kisch, Auburn, WA (US); Kyle Jeffries, Everett, WA (US); Dustin Schmidt, Seattle, WA (US); Peter Vogeli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1054 days.

(21) Appl. No.: 11/609,285

(22) Filed: Dec. 11, 2006

(65) Prior Publication Data

US 2008/0135174 A1    Jun. 12, 2008

(51) Int. Cl.
*B32B 15/00* (2006.01)

(52) U.S. Cl. ........ 156/247; 156/249; 156/344; 156/584; 156/540

(58) Field of Classification Search .......... None
See application file for complete search history.

(56) References Cited

U.S. PATENT DOCUMENTS

| | | | | |
|---|---|---|---|---|
| 3,775,219 A | 11/1973 | Karlson et al. | | 156/363 |
| 3,977,588 A * | 8/1976 | Meade et al. | | 226/168 |
| 4,407,688 A * | 10/1983 | Mussi et al. | | 156/242 |
| 4,557,790 A | 12/1985 | Wisbey | | |
| 4,699,683 A | 10/1987 | McCowin | | 156/353 |
| 4,842,684 A | 6/1989 | Tillement et al. | | |
| 4,891,090 A * | 1/1990 | Lorincz et al. | | 156/577 |
| 4,997,513 A * | 3/1991 | Lengen et al. | | 156/523 |
| 5,863,384 A | 1/1999 | Reddy | | 156/576 |
| 6,286,403 B1 * | 9/2001 | Rosenthal et al. | | 83/215 |
| 6,968,883 B2 | 11/2005 | Torres Martinez | | 156/433 |
| 2005/0039843 A1 | 2/2005 | Johnson et al. | | 156/175 |
| 2005/0109451 A1 | 5/2005 | Hauber et al. | | |
| 2006/0180264 A1 | 8/2006 | Kisch et al. | | 156/173 |

OTHER PUBLICATIONS

International Search Report on corresponding PCT application (PCT/US2007/023039) from International Searching Authority (EPO) dated May 8, 2008.
Written Opinion on corresponding PCT application (PCT/US2007/023039) from International Searching Authority (EPO) dated May 8, 2008.

* cited by examiner

*Primary Examiner* — Kimberly K McClelland
(74) *Attorney, Agent, or Firm* — Yee & Associates, P.C.

(57) ABSTRACT

The present invention provides an apparatus and associated method for removing backing film from tape or tape during the fiber placement process. The present invention uses a passive (non-powered) take-up roller to wind up the backing film that has been separated from the tape.

6 Claims, 3 Drawing Sheets

BACKING FILM REMOVAL SYSTEM AND METHOD FOR FIBER PLACEMENT MACHINE

BACKGROUND

1. Field of Invention

The present invention generally relates to a lamination device, and more particularly, to a system and method of fabricating a composite item.

2. Related Art

Composite items are typically constructed from layers of material that are laminated together. The categories of materials used to fabricate or "layup" composite items includes, for example: fiber; fabric; tape; film; and foil. When these items are arranged as woven sheets and unidirectional ribbons, for example they are referred to as fabric and tape respectively.

Fiber placement machines that apply tape require removal of a polyethylene backing film prior to lamination. Current systems depend on vacuum and/or compressed air to remove the backing film but are generally not reliable. Unreliable systems may cause excessive machine downtime and lower throughput.

What is needed an apparatus and associated method for removing backing film from tape during the fiber placement process that is reliable and may be passive.

SUMMARY OF THE INVENTION

The present invention provides an apparatus and associated method for removing backing film from tape or tape during the fiber placement process. The present invention uses a passive (non-powered) take-up roller to wind up the backing film that has been separated from the tape.

In one aspect of the present invention, a method is provided for removing backing film from a roll of tape, such as slit prepreg tape, used for tape laying or fiber placement. The method includes unwinding the tape from a roll using a first roller while the backing is attached partially removing the backing film from the tape and attaching the backing film to a second, take-up roller that is free to rotate; continuing to unwind the tape; partially wrapping it around the second, freely rotating take-up roller such that the tape drives the take-up roller as the tape laying or fiber placement proceeds.

In another aspect, the present invention provides an apparatus for removing backing film from a roll of tape used for tape laying or fiber placement. The invention includes a tape roller and backing film take-up roller, where the take-up roller has an axis which is parallel to a spool of tape. The take-up roller having the capacity to accept the entire length of backing film from the spool of tape as the tape unwinds from the spool, but before the tape enters a dispensing and compaction system. The take-up roller is driven by the tape as the tape is drawn by the tape roller from the spool on its way to the dispensing and compaction system This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of various objects of the present invention. The illustrated embodiment is intended to illustrate, but not to limit the invention. The drawings include the following.

DETAILED DESCRIPTION

Figure 1:
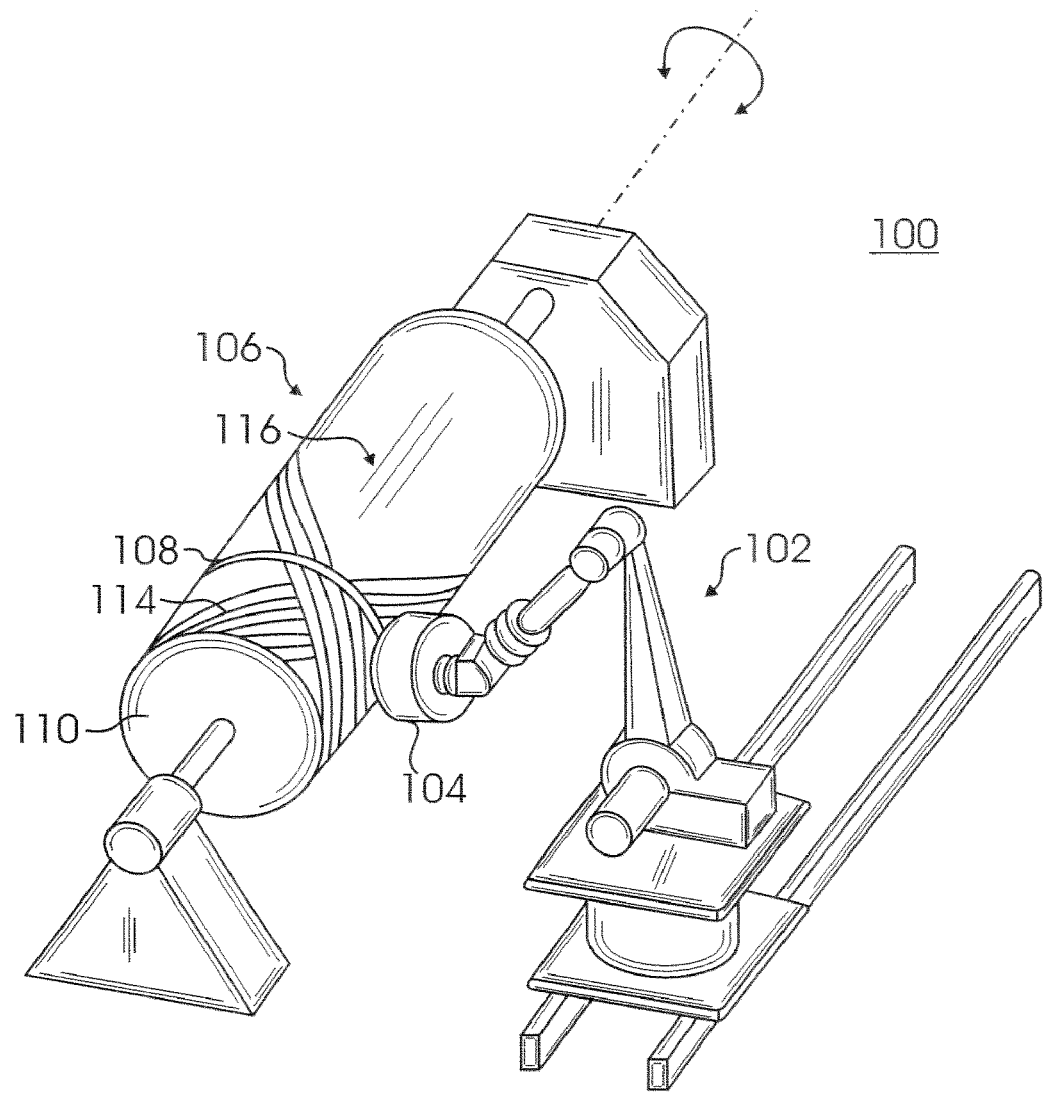
FIG. 1 is a simplified perspective view of an automated lamination device according to an embodiment of the invention.

FIG. 1 is a perspective view of a laminating device 100 according to an embodiment of the invention. In one embodiment, laminating device 100 includes a positioning device 102 and an end effector 104. Positioning device 102 is configured to position or otherwise control the movement of end effector 104. In one embodiment, positioning device 102 may be a robotic armature or gantry-type positioning device configured to control three to ten or more axes of movement.

Laminating device 102 is configured to fabricate an item 106 by applying a course material 108 on a form 110. Typically, item 106 is fabricated from multiple plies or layers of course material 108. In one embodiment, end effector 104 includes a compaction roller 218 (FIG. 2) and/or sweep to apply course material 108 to form 110. Form 110 may be configured to provide a suitably stable and finished surface for ply placement.

As shown in FIG. 1 form 110 is controlled to rotate about an axis. When controlled to rotate, form 110 is typically referred to as a mandrel In other embodiments, form 110 may be stationary or controlled to move in various axes. For example, form 110 may be secured to a sliding table or X-Y table.

Item 106 is shown in FIG. 1 being constructed from a plurality of courses 114. Each layer of courses 114 that is placed upon form 110 or a substrate 116 is described as a ply and item 106 is typically fabricated from a plurality of plies. Substrate 116 includes form 110 surface and/or a previously applied course 114.

A laminating device is disclosed in U.S. Pat. No. 7,472,736, which is incorporated herein by reference for all purposes.

Figure 2:
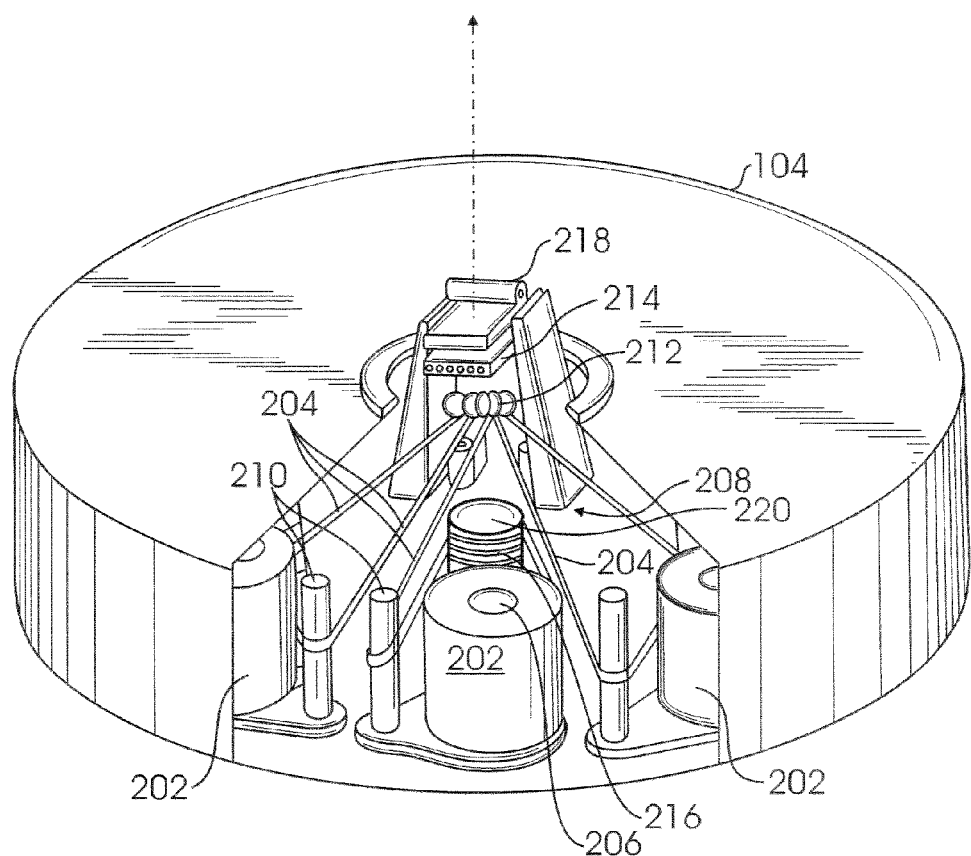
FIG. 2 is a simplified perspective view of a front of an end effector that is suitable for use with the laminating device of FIG. 1.

FIG. 2 is a perspective view of a front of end effector 104 that is suitable for use with laminating device 100. As shown in FIG. 2, end effector 104 includes a set of spools 202, a dancer roller 20, a redirecting pulley 212, a cutting assembly 214 a compaction roller 218 and a take-up roller 220.

In one embodiment, tape 204 includes backing film or separator film 216, which substantially prevents tape 204 from adhering to itself while it is on spool 202 or in roll film. Tape 204 may include any suitable course material for example, various fibers, films, foils, and/or the like. Particular examples of fibers include glass, aramid, carbon, and various other fibers. Tape 204 includes individual fibers, bundles, cords, plaits, ribbons in the form of unidirectional "tape," woven fabric, biaxial cloth and the like. In addition, tape 204 may be pre-impregnated with a resin or other such binding substance.

Each of spools 202 is mounted on a respective spindle or tensioner 206. Tensioner 206 detachably secures the respective spool 202 to end effector 104 and includes any suitable tensioning device such as, for example, a brake or motor to tension and otherwise modulate the rate at which tape 204 is dispensed. A specific example of a suitable tensioning device includes a belt that wraps around a portion of the circumference of tensioner 206 and generates friction that retards the rotation of tensioner 206.

End effector 104 further includes a path 208 for tape 204 to follow as it travels from spool 202 to compaction roller 218. As shown in FIG. 2, tape 204 with backing 216 traverses through path 208 from spool 202 around take-up roller 220 which takes up the separated backing film 216 around dancer roller 210, which dampens rapid changes in tape feed rates, and through redirecting pulley 212, used to guide tape 204 into cutting assembly 214. According to an embodiment dancer roller 210 and redirecting pulley 212 may be fixed in angle relative to one another. Thus, the angle at which tape 204 is introduced to redirecting pulley 212 remains substantially constant even as the radius of spool 202 decreases due to removal of tape 204. Dancer roller 210 further facilitates a smooth removal of tape 204 from spool 202 and facilitates removal of tape backing 216.

In one embodiment, take-up roller 220, may be a passive or non-powered, freely rotating take-up roll. The axis of take-up roller 220 is substantially parallel to the axis of spool 202. Take-up roller 220 has the capacity to accept the entire length of backing film 216 from spool 202 as tape 204 unwinds from spool 202.

Figure 3:
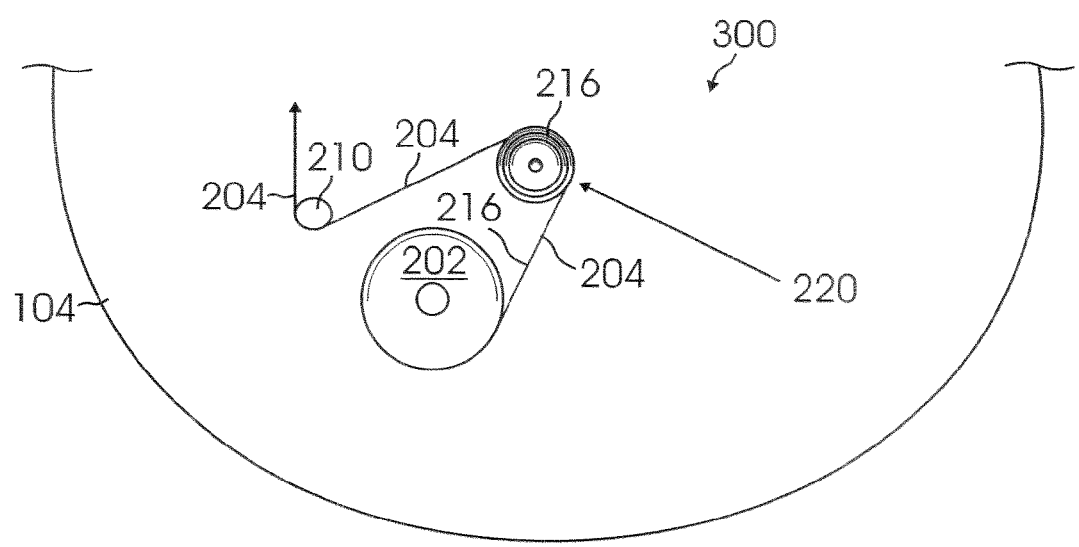
FIG. 3 is a simplified top view of a backing removal system for use with the end effector of FIG. 2 according to an embodiment of the invention.

FIG. 3 is a simplified top view of a backing removal system 300 according to an embodiment of the present invention. In one embodiments backing removal system 300 includes spool 202 dancer roller 210 and take-up roller 220, which may be driven by tape 204 as tape 204 is drawn from spool 202 toward compaction roller 218 (FIG. 2)

In one operational embodiment tape 204 is de-spooled with backing film 216 attached. Backing film 216 is attached to take-up roller 220, which is free to rotate. As tape 204 continues to unwind from spool 202 and traverse around take-up roller 220, backing film 216 is pulled away or separated from tape 204 and continues to wrap around take-up roller 220. Tape 204 continues to traverse path 208 after traversing take-up roller 220 with backing film 216 having been removed. In this manner, tape 204 drives take-up roller 220 as the tape laving or fiber placement proceeds.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method of removing backing film from a roll of tape used for tape laying or fiber placement comprising:
   unwinding tape from a spool while the backing film is still attached to the tape;
   extending a portion of the tape with the backing film still attached around a take-up roller;
   partially removing the backing film from the tape and attaching the backing film to the take-up roller;
   extending a portion of the tape with the backing film removed from the take-up roller to a dancer roller; and
   wrapping the backing film continuously around the take-up roller as the take-up roller is driven by movement of the tape around the take-up roller as the tape is moved from the spool to the dancer roller,
   wherein the take-up roller comprises a freely rotating take-up roller driven only by the movement of the tape around the take-up roller.

2. The method of claim 1, wherein the tape comprises slit tape prepreg.

3. The method of claim 1, further comprising, storing the backing film on the take-up roller.

4. The method of claim 1, further comprising extending a portion of the tape with the backing film removed from the dancer roller through a redirecting pulley.

5. The method of claim 4 wherein the dancer roller and the redirecting pulley are fixed in angle relative to each other.

6. The method of claim 4, further comprising extending a portion of the tape with the backing film removed from the redirecting pulley into a cutting assembly.

* * * * *